US012168360B2

(12) United States Patent
Murakami et al.

(10) Patent No.: US 12,168,360 B2

(45) Date of Patent: Dec. 17, 2024

(54) METHOD FOR MANUFACTURING PRINTED MATTER, PRINTING DEVICE, AND PRINTED CAN

(71) Applicant: TOYO SEIKAN CO., LTD., Shinagawa-ku Tokyo (JP)

(72) Inventors: Shigenobu Murakami, Yokohama (JP); Yukiko Saito, Yokohama (JP); Kouji Yamada, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 104 days.

(21) Appl. No.: 17/914,448

(22) PCT Filed: Feb. 22, 2021

(86) PCT No.: PCT/JP2021/006676
§ 371 (c)(1),
(2) Date: Sep. 26, 2022

(87) PCT Pub. No.: WO2021/199794
PCT Pub. Date: Oct. 7, 2021

(65) Prior Publication Data

US 2023/0347676 A1 Nov. 2, 2023

(30) Foreign Application Priority Data

Mar. 31, 2020 (JP) ................................ 2020-063879

(51) Int. Cl.
*B41M 5/00* (2006.01)
*B41J 3/407* (2006.01)
*B41J 3/413* (2006.01)

(52) U.S. Cl.
CPC ........ *B41M 5/0047* (2013.01); *B41J 3/40733* (2020.08); *B41J 3/413* (2013.01)

(58) Field of Classification Search
CPC .... B41J 3/413; B41J 3/40733; B41M 5/0017; B41M 5/0041; B41M 5/0047; B41M 5/0058
See application file for complete search history.

(56) References Cited

U.S. PATENT DOCUMENTS

2007/0296790 A1* 12/2007 Nakazawa ........... B41M 7/0081 347/102
2009/0085996 A1 4/2009 Kasai
(Continued)

FOREIGN PATENT DOCUMENTS

CN 207257125 U 4/2018
DE 102015219975 A1 4/2017
(Continued)

OTHER PUBLICATIONS

Ozeki, MachineTranslationofWO-2019230471-A1,2019 (Year: 2019).*
(Continued)

*Primary Examiner* — Scott A Richmond
(74) *Attorney, Agent, or Firm* — MARSHALL, GERSTEIN & BORUN LLP

(57) ABSTRACT

The present invention addresses the problem of printing a high-resolution inkjet image on an article to be printed made of a metal or a resin by adjusting wet-spreading of an ink. The problem is solved by a method for producing a printed article which is an inkjet-printed product of an article to be printed made of a metal or a resin, the method including: an underlying layer forming step of forming an underlying layer containing a crosslinkable resin on at least a part of a surface of the article to be printed; a semi-crosslinking step of semi-crosslinking the crosslinkable resin contained in the underlying layer; and a printing step of performing inkjet
(Continued)

printing on at least a part of a surface of the underlying layer after the semi-crosslinking step to form an inkjet-printed layer.

13 Claims, 2 Drawing Sheets

(56) References Cited

U.S. PATENT DOCUMENTS

| | | | |
|---|---|---|---|
| 2013/0176358 | A1 | 7/2013 | Yamada et al. |
| 2014/0028771 | A1 | 1/2014 | Yamada et al. |
| 2016/0075148 | A1 | 3/2016 | Nakano |
| 2016/0303879 | A1 | 10/2016 | Yamada et al. |
| 2018/0056671 | A1 | 3/2018 | Boniface |

FOREIGN PATENT DOCUMENTS

| | | | | |
|---|---|---|---|---|
| JP | 2008-023980 | A | 2/2008 | |
| JP | 2008-100501 | A | 5/2008 | |
| JP | 2009-083267 | A | 4/2009 | |
| JP | 2009-184206 | A | 8/2009 | |
| JP | 2012-086870 | A | 5/2012 | |
| JP | 2015-117030 | A | 6/2015 | |
| JP | 2016-060049 | A | 4/2016 | |
| JP | 2018-135448 | A | 8/2018 | |
| JP | 6388243 | B1 * | 9/2018 | ................ B41J 2/01 |
| JP | 2020-001189 | A | 1/2020 | |
| WO | WO-2017/145159 | A1 | 8/2017 | |
| WO | WO-2019230471 | A1 * | 12/2019 | |
| WO | WO-2021/154751 | A1 | 8/2021 | |

OTHER PUBLICATIONS

Sugihara, MachineTranslationofJP-6388243-B1, 2018 (Year: 2018).*
U.S. 2007/296790 A1 is an English language equivalent of JP 2008-023980 A.
U.S. 2009/085996 A1 is an English language equivalent of JP 2009-083267 A.
U.S. 2013/176358 A1 is an English language equivalent of JP 2012-086870 A.
U.S. 2016/075148 A1 is an English language equivalent of JP 2016/060049 A.
Search Report in International Application No. PCT/JP2021/006676 dated May 25, 2021, 8 pages.
Extended European Search Report in EP Application No. 21782078.6 dated Jul. 25, 2023, 11 pages.

* cited by examiner

METHOD FOR MANUFACTURING PRINTED MATTER, PRINTING DEVICE, AND PRINTED CAN

TECHNICAL FIELD

The present invention relates to a method for producing a printed article, a printing apparatus, and a printed can.

BACKGROUND ART

In the process of producing a printed can, patterns and/or characters are printed on a metal sheet forming a can body, or on a can body after the can body is integrally molded with a bottom piece. The printing on the metal sheet or the can body may be done by plate-type printing or inkjet printing, and inkjet printing is advantageous in that it has no plate-making cost and allows a change in the printing design in a short period.

As a technology for printing on a printed can by inkjet printing, for example, FIG. 5 of Patent Document 1 discloses a technology in which a printed image is formed on a seamless can mounted on a mandrel by sequentially spraying droplets of inks from inkjet heads corresponding to the respective white (W), yellow (Y), magenta (M), cyan (C), and black (K) inks.

PRIOR ART DOCUMENT

Patent Document

Patent Document 1: Japanese Unexamined Patent Application Publication No. 2012-86870

SUMMARY OF THE INVENTION

Problems to be Solved by the Invention

The smallest unit of inkjet image printing is an ink dot formed on an article to be printed and, in order to print a high-resolution image such as a photographic or text image that is required to be a fine image, it is necessary to reduce the dot size. However, an article to be printed made of a metal or a resin has a low ink absorption, therefore, when such an article to be printed is directly inkjet-printed, a fine image cannot be obtained due to wet-spreading of an ink on the surface of the article to be printed, which causes an increase in the dot size. An object of the present invention is to print a high-resolution inkjet image on an article to be printed made of a metal or a resin by adjusting wet-spreading of an ink.

Means for Solving the Problems

In the intensive studies conducted by the inventors of the present invention to solve the above-described problems, it was considered to arrange an underlying layer on the surface of an article to be printed so as to inhibit wet-spreading of an ink. The inventors of the present invention discovered that, in inkjet printing on an article to be printed made of a metal or a resin, wet-spreading of an ink is adjusted and a high-resolution image can thus be printed by semi-crosslinking a crosslinkable resin contained in the underlying layer in advance, thereby completing the present invention.

That is, the present invention encompasses the followings.

[1] A method for producing a printed article which is an inkjet-printed product of an article to be printed made of a metal or a resin, the method comprising:

an underlying layer forming step of forming an underlying layer comprising a crosslinkable resin on at least a part of a surface of the article to be printed;

a semi-crosslinking step of semi-crosslinking the crosslinkable resin comprised in the underlying layer; and a printing step of performing inkjet printing on at least a part of a surface of the underlying layer after the semi-crosslinking step to form an inkjet-printed layer.

[2] The method for producing a printed article according to [1], further comprising an overcoat layer forming step of forming an overcoat layer on at least the inkjet-printed layer.

[3] The method for producing a printed article according to [1] or [2], wherein the crosslinkable resin is at least one resin selected from the group consisting of an acrylic resin, a polyester resin, an epoxy resin, a vinyl resin, a urethane resin, and an amino resin.

[4] The method for producing a printed article according to any one of [1] to [3], wherein the underlying layer further comprises titanium oxide.

[5] The method for producing a printed article according to any one of [1] to [4], wherein the semi-crosslinking step is performed by heating the underlying layer.

[6] The method for producing a printed article according to any one of [1] to [4], wherein the semi-crosslinking step is performed by irradiating the underlying layer with an active energy ray.

[7] The method for producing a printed article according to any one of [1] to [6], wherein the article to be printed is a metal sheet for a container, a metal container, a resin film for a container, or a resin container.

[8] The method for producing a printed article according to [7], wherein the article to be printed is a seamless beverage can.

[9] A printing apparatus for performing inkjet printing on an article to be printed made of a metal or a resin, the printing apparatus comprising:

a transport device for transporting the article to be printed;

an underlying layer forming device for forming an underlying layer comprising a crosslinkable resin on at least a part of a surface of the article to be printed;

a curing device which is arranged in the downstream of the coating underlying layer forming device and is for semi-crosslinking the crosslinkable resin comprised in the underlying layer; and an inkjet printing station which is arranged in the downstream of the curing device and which is for performing inkjet printing on at least a part of a surface of the underlying layer to form an inkjet-printed layer.

[10] The printing apparatus according to [9], comprising an overcoat layer forming device for forming an overcoat layer on the inkjet-printed layer.

[11] A printed can which has an inkjet-printed layer and an underlying layer, wherein the inkjet-printed layer is formed on at least a part of a surface of the underlying layer, and the underlying layer is formed on at least a part of a surface of a can body and comprises a crosslinked resin.

[12] The printed can according to [11], wherein the inkjet-printed layer has a printing resolution of 300 dpi or more.

[13] A metal can having an underlying layer, wherein the metal can has an underlying layer comprising a semi-crosslinked product of a crosslinkable resin on at least a part of a surface of a can body.

Advantageous Effects of Invention

According to the present invention, a high-resolution inkjet image can be printed on an article to be printed made of a metal or a resin by adjusting wet-spreading of an ink.

Figure 1:
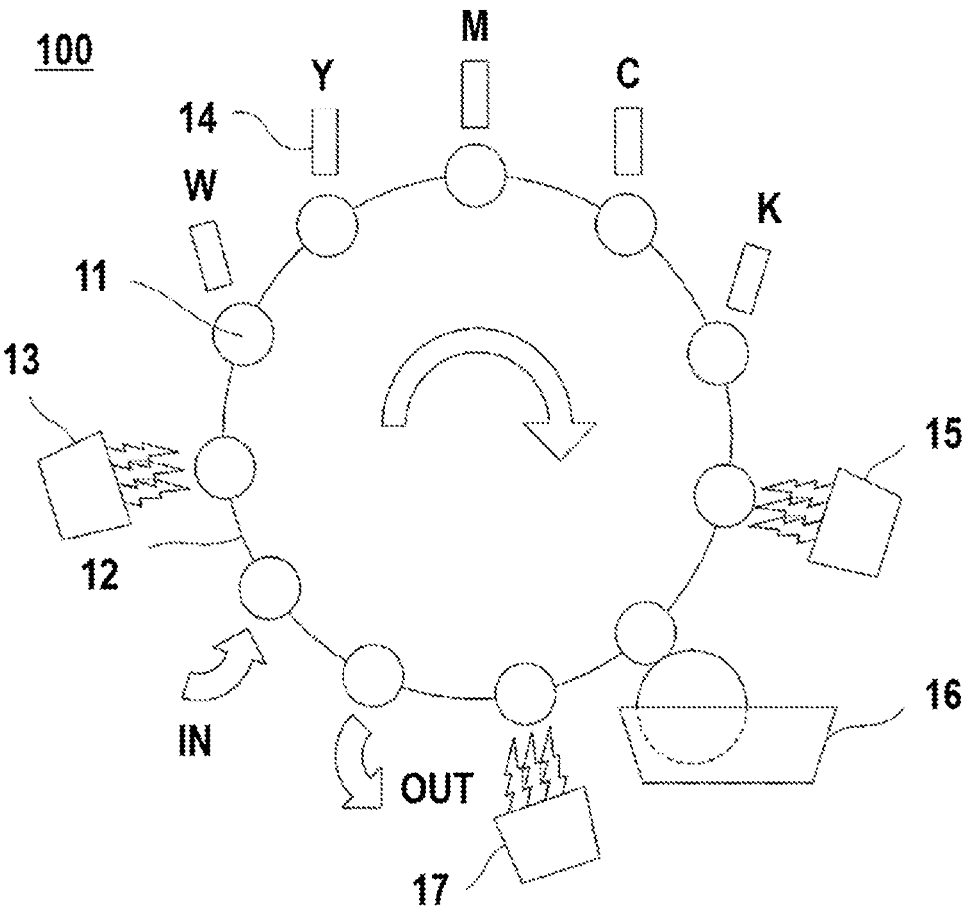
FIG. 1 is a schematic drawing that illustrates one example of the constitution of the printing apparatus according to the present embodiment.

DESCRIPTION OF EMBODIMENTS (1. Method of Producing Printed Article)

A first embodiment of the present invention is a method for producing a printed article, which method includes: an underlying layer forming step of forming an underlying layer containing a crosslinkable resin on at least a part of a surface of the article to be printed made of a metal or a resin; a semi-crosslinking step of semi-crosslinking the crosslinkable resin contained in the underlying layer; and a printing step of performing inkjet printing on at least a part of a surface of the underlying layer after the semi-crosslinking step to form an inkjet-printed layer.

(1-1. Underlying Layer Forming Step)

The underlying layer forming step is the step of forming an underlying layer containing a crosslinkable resin on at least a part of the surface of an article to be printed made of a metal or a resin.

The article to be printed is not particularly limited as long as it is an article on which an ink is likely to wet-spread and which is made of a metal or a resin, and a variety of articles can be employed.

Examples of an article to be printed made of a metal include a metal container such as a three-piece can (a welded can) having a seam on the side surface, or a seamless can (a two-piece can); and a metal sheet, desirably a metal sheet for constructing the body of a three-piece can. Thereamong, the article to be printed made of the metal is preferably a seamless can, more preferably a seamless beverage can.

Examples of an article to be printed made of a resin include: a resin film, for example, a film for a container such as a pouch, or a labeling film; and a resin container such as a PET bottle, a multilayer plastic container, or a tube-shaped container.

The underlying layer is not particularly limited as long as it is a layer that contains a crosslinkable resin, and may be, for example, an anchor coat layer, a base coat layer, or a white coat layer. When the underlying layer is a white coat layer, the underlying layer desirably contains titanium oxide as a pigment.

A method for forming the underlying layer is not particularly limited, and the underlying layer may be formed by, for example, applying a coating material that contains a crosslinkable resin, or laminating a film that contains a crosslinkable resin. The thickness of the underlying layer is also not particularly limited, and can be set as appropriate by a person of ordinary skill in the art.

The crosslinkable resin is not particularly limited and, for example, a thermally crosslinkable resin or an active energy ray-crosslinkable resin can be employed. It is noted here that the term "active energy ray" used in the present embodiment means an ionizing radiation such as ultraviolet ray, electron beam, α-ray, β-ray, or γ-ray.

More specific examples of the crosslinkable resin include: a (meth)acrylic resin such as polyacrylonitrile, polymethyl acrylate, or polymethyl methacrylate; a polyester resin such as polyethylene terephthalate, an isophthalic acid-modified polyethylene terephthalate, or polyethylene naphthalate; an epoxy resin such as a bisphenol A-type epoxy resin, a bisphenol F-type epoxy resin, or a cresol-novolac epoxy resin; a vinyl resin such as polyvinyl acetate or polyvinyl chloride; a urethane resin such as diphenylmethane diisocyanate-polyethylene glycol copolymer; and an amino resin such as a melamine resin, an urea resin, or a benzoguanamine resin. The crosslinkable resin is not limited to a single kind, and may be a mixed resin obtained by blending two or more kinds of the above-exemplified crosslinkable resins.

The crosslinkable resin is preferably selected from resins that are crosslinked by the same means as the below-described means for curing inks for inkjet printing and/or an overcoat. This allows crosslinking of the crosslinkable resin to progress along with curing of the inks and/or the overcoat, and thus makes it unnecessary to separately perform a step of sufficiently crosslinking the crosslinkable resin; therefore, the production cost can be reduced.

As required, the underlying layer may also contain, for example, a resin other than the crosslinkable resin, a crosslinking agent, a crosslinking accelerator, and various additives within a range that does not inhibit the functions of the underlying layer.

(1-2. Semi-Crosslinking Step)

The semi-crosslinking step is the step of semi-crosslinking the crosslinkable resin contained in the underlying layer formed by the underlaying layer forming step. By semi-crosslinking the crosslinkable resin contained in the underlying layer, wet-spreading of an ink applied onto the underlying layer by the below-described inkjet printing is adjusted, so that a high-resolution image can be printed.

It is noted here that the term "semi-crosslinking" (may be also referred to as semi-curing, pre-curing, or the like) means a state in which crosslinking of the crosslinkable resin has progressed but the crosslinking reaction has not been completely finished.

In the present embodiment, a semi-crosslinked state of the crosslinkable resin can be evaluated by an IPA rubbing method using isopropyl alcohol (IPA) as a solvent. The value of this evaluation is expressed in terms of the number of rubbing actions performed in a state where a semi-crosslinked product is wetted with IPA, and a larger evaluation value indicates a further progress of crosslinking, whereas a smaller evaluation value indicates less progress of crosslinking. In the present embodiment, this evaluation value is preferably in a range of 5 times or more and 50 times or less, more preferably 11 times or more and 40 times or less. When the evaluation value is equal to or less than the above-described upper limit, excessive wet-spreading of an ink is inhibited, so that dots having a small diameter can be formed. Further, by controlling the evaluation value to be equal to or larger than the above-described lower limit, the stickiness of the underlying layer is reduced, so that inconvenience such as adhesion of the underlying layer of a plurality of articles to be printed can be avoided, for example, during transport of the articles to be printed.

A semi-crosslinking method can be selected as appropriate in accordance with the crosslinkable resin.

For example, when the crosslinkable resin is a thermally crosslinkable resin, the semi-crosslinking may be performed by heating the underlying layer. Heating conditions for achieving an intended semi-crosslinked state, such as heating temperature or heating time, may be selected as appropriate in accordance with the crosslinkable resin to be used, the type of an inkjet ink, the intended dot size, and the like. Specifically, for example, as described below in the section of Examples, in the case of forming the underlying layer using a coating material containing a polyester resin as the crosslinkable resin and subsequently forming an image having a resolution of 300 dpi with dots of 85 μm in diameter using a thermosetting ink (black ink, manufactured by TOMATEC Co., Ltd.), a desired crosslinked state can be obtained by performing 1-minute pre-baking at 155° C.

When the crosslinkable resin is an active energy ray-crosslinkable resin, the semi-crosslinking thereof can be performed by irradiating the underlying layer with an active energy ray such as ultraviolet ray or electron beam. Irradiation conditions for obtaining an intended semi-crosslinked state may be selected as appropriate in accordance with the crosslinkable resin to be used, the presence or absence of addition of a crosslinking accelerator or the like, the intended dot size, and the like.

(1-3. Printing Step)

The printing step is the step of performing inkjet printing on at least a part of a surface of the underlying layer after the semi-crosslinking step to form an inkjet-printed layer. An image to be printed by the inkjet printing is not particularly limited, and may be various images such as a photograph, a pattern, or a character.

In the inkjet printing, for example, as illustrated in FIG. 1, droplets of inks are sequentially sprayed from inkjet heads corresponding to the respective inks of white (W), yellow (Y), magenta (M), cyan (C), black (K) and the like to form an inkjet-printed layer. It is noted that the arrangement of the inkjet heads of the respective colors is not limited to the example illustrated in FIG. 1, and the inkjet heads can be arranged in any sequence.

The inks for the inkjet printing according to the present embodiment are not particularly limited as long as the effects of the present invention are not impaired, and may be selected as appropriate from known inks that are conventionally used in inkjet printing of a recording medium made of a metal or a resin, such as a heat-drying ink, a thermosetting ink, or an active energy ray-curable ink (e.g., an ultraviolet ray-curable ink and an electron beam-curable inks).

The inks preferably have a surface tension of 25 mN/m or more and 30 mN/m or less. By controlling the surface tension of the inks to be in this range, wet-spreading of the inks is inhibited, so that dots having a small diameter are easily formed. In order to adjust the surface tension of the inks, for example, the type of a dye or a pigment in each ink may be adjusted as appropriate, a surfactant such as a silicone-based surfactant may be added, or the type of a solvent may be adjusted as appropriate.

Further, the viscosity of the inks varies depending on the type and the like of the inkjet heads; however, it is preferably 8 mPa·s or more and 15 mPa·s or less. By controlling the viscosity of the inks to be in this range, wet-spreading of the inks is inhibited, so that dots having a small diameter are easily formed. In order to adjust the viscosity of the inks, for example, the type of a resin used as a binder may be adjusted as appropriate, inorganic particles of silica or the like may be contained into each ink, a thickening agent may be added, or the type of a solvent may be adjusted as appropriate.

In the present embodiment, inkjet printing is performed on the underlying layer after semi-crosslinking of the crosslinkable resin contained in the underlying layer, whereby dots having a small diameter can be printed, so that a high-resolution image can be formed. The term "high-resolution image" used herein refers to, for example, an image having a resolution of 300 dpi or more, 600 dpi or more, 720 dpi or more, or 1,200 or more. For the formation of an image having a resolution of 300 dpi, 600 dpi, 720 dpi, or 1,200 dpi, the discharge of the inks may be controlled such that the dot size is about 85 μm, about 42 μm, about 35 μm, or about 21 μm, respectively.

It is noted here that the "dot size" of an ink means the size of dots that are formed after wet-spreading of ink droplets landed on a recording medium. The dot size of an ink can be determined by, for example, light microscope observation. In other words, in the present embodiment, a dot pattern is formed on the surface of the underlying layer after the semi-crosslinking step, plural dots are arbitrarily selected from the dot pattern observed under a light microscope, the major axis and the minor axis of each dot are measured, and an average value thereof can be determined as the dot size.

The inkjet-printed layer formed by the inkjet printing is preferably pre-baked to pre-cure the inks prior to application of an overcoat thereto. This further inhibits wet-spreading of the inks, so that a high-resolution image can be formed.

(1-4. Overcoat Layer Forming Step)

The overcoat layer forming step is the step of forming an overcoat layer on at least the inkjet-printed layer. By forming an overcoat layer on the inkjet-printed layer, for example, even when the resulting printed article is subjected to a necking process, a pressing process, or retort sterilization, not only detachment of the inkjet-printed layer can be inhibited, but also the scratch resistance and the decorative property of the printed article can be improved.

As an overcoat used for the formation of an overcoat layer, any known transparent coating material used as a topcoat for a printed article can be employed. Examples of the known transparent coating material include transparent coating materials that contain, for example: a thermosetting resin such as a polyester resin, an acrylic resin, or an epoxy resin; a curing agent such as an amino resin, a phenol resin, or an isocyanate resin; or a lubricant such as a paraffin wax, a polyethylene wax, or a silicone wax.

An overcoat layer is formed by applying an overcoat onto the inkjet-printed layer in such an amount that gives the resulting overcoat layer a thickness of usually 0.1 μm or more and 10 μm or less, preferably 0.5 μm or more and 5 μm or less, and subsequently heating the overcoat at a temperature of 170° C. or higher and 230° C. or lower for 0.5 minute or longer and 2 minutes or shorter.

(1-5. Other Steps)

The method for producing a printed article according to the present embodiment may also include optional steps in addition to the above-described steps. For example, when the means for crosslinking the crosslinkable resin contained in the underlying layer is different from the means for curing the inks and/or the overcoat, the method for producing the printed article according to the present embodiment preferably includes the crosslinking step of sufficiently crosslinking the crosslinkable resin. Examples of other arbitrary steps include: the plate-type printing step of forming a print, a solid image, or the like by plate-type printing; and the adhesive layer forming step of forming an adhesive layer for improving the interlayer adhesion.

(2. Printing Apparatus)

A second embodiment of the present invention is a printing apparatus which performs inkjet printing on an article to be printed made of a metal or a resin and is used for carrying out the method for producing the printed article according to the first embodiment. The printing apparatus according to the present embodiment includes: a transport device for transporting the article to be printed; an underlying layer forming device for forming an underlying layer comprising a crosslinkable resin on at least a part of a surface of the article to be printed; a curing device which is arranged in the downstream of the coating underlying layer forming device and is for semi-crosslinking the crosslinkable resin comprised in the underlying layer; and an inkjet printing station which is arranged in the downstream of the curing device and which is for performing inkjet printing on at least a part of a surface of the underlying layer to form an inkjet-printed layer.

The printing apparatus according to the present embodiment preferably includes an overcoat layer forming device for forming an overcoat layer on the inkjet-printed layer.

When the producing method according to the second embodiment further includes the crosslinking step, the plate-type printing step, the adhesive layer forming step and the like, the printing apparatus according to the present embodiment further includes units for performing these respective steps.

One example of the constitution of the printing apparatus according to the present embodiment will now be described.

FIG. 1 is a schematic drawing that illustrates one example of the constitution of a printing apparatus 100.

In the printing apparatus 100, a coating material for an underlying layer is applied to the surface of a can by a underlying layer forming device (not illustrated) and dried with hot air to form an underlying layer containing a crosslinkable resin. A can 11, on which the underlying layer has been formed, is set on a mandrel wheel 12 and transported along the arrow. The underlying layer is heated in an oven 13, and the crosslinkable resin contained in the underlying layer is thereby semi-crosslinked. Then, in an inkjet printing station having plural inkjet heads 14 that discharge thermosetting inks of the respective colors of white (W), yellow (Y), magenta (M), cyan (C), and black (K), inkjet printing is performed on the underlying layer to form an inkjet-printed layer. It is noted here that the order of the colors is not particularly limited, and the colors of the inks are not limited to the above-described ones. Accordingly, an ink may be a clear ink. Subsequently, the inkjet-printed layer is pre-baked by a pre-baking device 15. Thereafter, an overcoat is applied to the entire surface of the can 11 by an overcoat layer forming device 16, followed by hot-air drying. Lastly, the overcoat is thermally cured in an oven 17, whereby a printed can is obtained.

(3. Printed Can)

A third embodiment of the present invention is a printed can manufactured by the producing method according to the first embodiment, and the printed can includes: an underlying layer that is formed on at least a part of a surface of a can body and contains a crosslinked resin; and an inkjet-printed layer that is formed on at least a part of a surface of the underlying layer. In addition to the underlying layer and the inkjet-printed layer, as required, the printed can according to the present embodiment may also include optional layers, such as an anchor coat layer or an adhesive layer.

The inkjet-printed layer has a printed image resolution of usually 300 dpi or more, preferably 600 dpi or more, more preferably 720 dpi or more, still more preferably 1,080 dpi or more. By forming the underlying layer containing the crosslinkable resin on a region where inkjet printing is to be performed, semi-crosslinking the crosslinkable resin, and subsequently performing inkjet printing on the underlying layer, wet-spreading of an ink is inhibited and dots having a small diameter can thus be formed; therefore, a high-resolution printing can be realized in this manner.

(4. Metal Can with Underlying Layer)

A fourth embodiment of the present invention is a metal can that is obtained by, in the producing method according to the first embodiment of the present invention, using a metal can as the article to be printed and performing the steps up to the semi-crosslinking step. This metal can having an underlying layer according to the present embodiment includes an underlying layer containing a semi-crosslinked crosslinkable resin on at least a part of a surface of a can body. In addition to the underlying layer, as required, the metal can with an underlying layer according to the present embodiment may also include optional layers, such as an anchor coat layer or an adhesive layer.

EXAMPLES

Specific experiments conducted before the completion of the present invention will now be described.

It is noted here that, in each Experimental Example, the semi-crosslinked state of a crosslinkable resin in an underlying layer, the size of dots formed by inkjet printing, and a printed image were evaluated by the below-described respective methods.

<Evaluation of Semi-Crosslinked State>

The semi-crosslinked state of a crosslinkable resin contained in an underlying layer was evaluated as follows. A gauze was put on the tip of a 1-kg hammer with a handle and impregnated with isopropyl alcohol (IPA) and, holding the hammer in one hand, the wet gauze was applied to the surface of the underlying layer after the semi-crosslinking step and reciprocated over a distance of 10 cm at a constant rate. The rate was one reciprocation per second. The number of reciprocations was counted until the underlying layer was peeled off, and the thus obtained value was defined as the number of rubbing actions. The peeling of the underlying layer was evaluated visually. One reciprocation was taken as a single rubbing action. The semi-crosslinked state was evaluated as follows based on the number of rubbing actions.

1 time or more and 4 times or less: insufficient crosslinking 5 times or more and 10 times or less: fairly good semi-crosslinked state (acceptable range)

11 times or more and 40 time or less: good semi-crosslinked state (optimum range)

41 times or more and 50 times or less: fairly good semi-crosslinked state (acceptable range)

51 times or more: excessive crosslinking

<Dot Size>

A dot pattern portion of a printed article obtained in each Experimental Example was observed under a light microscope. Ten dots were arbitrarily selected from the dot pattern, the major axis and the minor axis of each dot was measured, and an average value thereof was defined as the dot size.

<Image Evaluation>

A printed image of a printed article obtained in each Experimental Example was visually evaluated based on the following evaluation criteria.

S: The printed image was very clear.

A: The image was sufficiently recognizable despite having a slight blurriness in the contour portion.

B: The image was unclear.

Experimental Example 1

A printed can was produced using the printing apparatus illustrated in FIG. 1.

A coating material containing a polyester resin as a crosslinkable resin and an amino resin as a crosslinking agent was applied to a seamless aluminum can to form an underlying layer on the surface of the can body. The thus formed underlying layer was semi-crosslinked by heating (pre-baking) at 185° C. for 30 seconds.

Thereafter, a printed can was obtained by forming a dot pattern and an image on the underlying layer by inkjet printing using an inkjet ink (black ink, manufactured by TOMATEC Co., Ltd.) with the inkjet image resolution and the amount of discharged droplets being set at 300 dpi and 6 pl, respectively.

Figure 2:
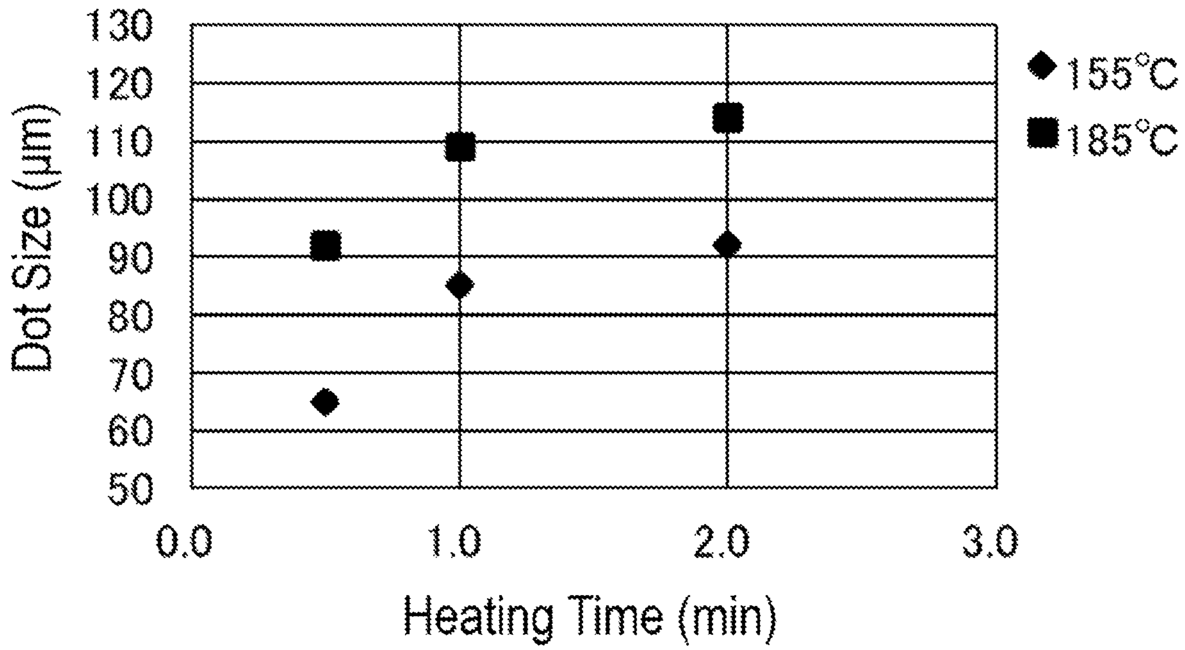
FIG. 2 is a graph obtained by plotting the relationship between the semi-crosslinking conditions and the dot sizes of each of Experimental Examples 1 to 6.

FIG. 2 shows a graph obtained by plotting the relationship between the semi-crosslinking condition and the dot size. In addition, the results of evaluating the semi-crosslinked state of the underlying layer, the dot size, and the printed image are shown in Table 1. It is noted here that the dot size set at a resolution of 300 dpi was 85 μm, and the evaluation was performed in accordance with the above-described evaluation criteria.

Experimental Examples 2 to 6

A printed can was produced in the same manner as in Experimental Example 1, except that the crosslinkable resin contained in the coating material used for the formation of an underlying layer, the semi-crosslinking method, the resolution, and the amount of discharged droplets were changed as shown in Table 1. The results of evaluating the semi-crosslinked state of the underlying layer, the dot size, and the printed image are shown in Table 1. In addition, a graph obtained by plotting the relationship between the semi-crosslinking conditions and the dot sizes is shown in FIG. 2.

From the above results, it was demonstrated that, by semi-crosslinking a crosslinkable resin contained in an underlying layer, wet-spreading of an ink is inhibited, so that a high-resolution inkjet image can be printed on a seamless can.

REFERENCE SIGNS LIST

100: printing apparatus
11: can
12: mandrel wheel
13: oven
14: inkjet head
15: pre-baking device
16: overcoat layer forming device
17: oven

The invention claimed is:

1. A method for producing a printed article which is an inkjet-printed product of an article to be printed made of a metal or a resin, the method comprising:

an underlying layer forming step of forming an underlying layer comprising a crosslinkable resin on at least a part of a surface of the article to be printed;

a semi-crosslinking step of semi-crosslinking the crosslinkable resin comprised in the underlying layer; and a printing step of performing inkjet printing on at least a part of a surface of the underlying layer after the semi-crosslinking step to form an inkjet-printed layer.

2. The method for producing a printed article according to claim 1, further comprising an overcoat layer forming step of forming an overcoat layer on at least the inkjet-printed layer.

3. The method for producing a printed article according to claim 1, wherein the crosslinkable resin is at least one resin selected from the group consisting of an acrylic resin, a polyester resin, an epoxy resin, a vinyl resin, a urethane resin, and an amino resin.

4. The method for producing a printed article according to claim 1, wherein the underlying layer further comprises titanium oxide.

5. The method for producing a printed article according to claim 1, wherein the semi-crosslinking step is performed by heating the underlying layer.

6. The method for producing a printed article according to claim 1, wherein the semi-crosslinking step is performed by irradiating the underlying layer with an active energy ray.

TABLE 1

| | Crosslinkable resin contained in underlying layer | Semi-crosslinking method | Semi-crosslinked state (times) | Resolution (dpi) | Discharged droplets (pl) | Dot size (μm) | Image evaluation |
|---|---|---|---|---|---|---|---|
| Experimental Example 1 | Polyester resin | Heating 185° C. 0.5 min | 42 | 300 | 6 | 92 | S |
| Experimental Example 2 | Polyester resin | Heating 185° C. 1 min | ≥51 | 300 | 6 | 109 | A to B |
| Experimental Example 3 | Polyester resin | Heating 185° C. 2 min | ≥51 | 300 | 6 | 114 | B |
| Experimental Example 4 | Polyester resin | Heating 155° C. 0.5 min | 10 | 300 | 6 | 65 | S |
| Experimental Example 5 | Polyester resin | Heating 155° C. 1 min | 22 | 300 | 6 | 85 | S |
| Experimental Example 6 | Polyester resin | Heating 155° C. 2 min | 38 | 300 | 6 | 92 | S |

7. The method for producing a printed article according to claim 1, wherein the article to be printed is a metal sheet for a container, a metal container, a resin film for a container, or a resin container.

8. The method for producing a printed article according to claim 7, wherein the article to be printed is a seamless beverage can.

9. A printing apparatus for performing inkjet printing on an article to be printed made of a metal or a resin, the printing apparatus comprising:

a transport device for transporting the article to be printed;

an underlying layer forming device for forming an underlying layer comprising a crosslinkable resin on at least a part of a surface of the article to be printed;

a curing device which is arranged downstream of the underlying forming device and is for semi-crosslinking the crosslinkable resin comprised in the underlying layer; and an inkjet printing station which is arranged downstream of the curing device and which is for performing inkjet printing on at least a part of a surface of the underlying layer to form an inkjet-printed layer.

10. The printing apparatus according to claim 9, comprising an overcoat layer forming device for forming an overcoat layer on the inkjet-printed layer.

11. A printed can which has an inkjet-printed layer and an underlying layer, wherein the inkjet-printed layer is formed on at least a part of a surface of the underlying layer, and the underlying layer is formed on at least a part of a surface of a can body and comprises a crosslinked resin.

12. The printed can according to claim 11, wherein the inkjet-printed layer has a printing resolution of 300 dpi or more.

13. A metal can having an underlying layer, wherein the metal can has an underlying layer comprising a semi-crosslinked product of a crosslinkable resin on at least a part of a surface of a can body.

* * * * *